May 6, 1969  A. PICKER  3,442,570
PIEZOELECTRIC LASER BEAM DEFLECTOR
Filed March 2, 1966  Sheet 1 of 2

Amos Picker,
INVENTOR.
BY
ATTORNEY.

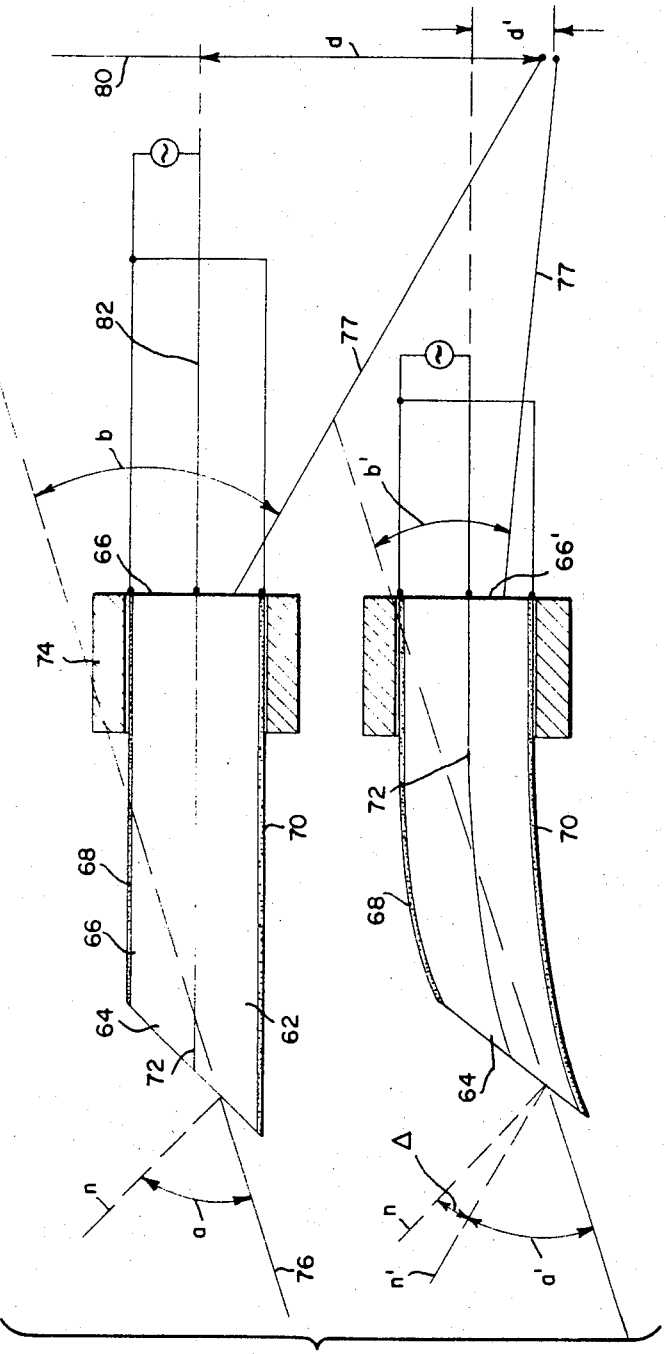

United States Patent Office 3,442,570
Patented May 6, 1969

3,442,570
PIEZOELECTRIC LASER BEAM DEFLECTOR
Amos Picker, Carlsbad, Calif., assignor to Hughes Aircraft Company, Culver City, Calif., a corporation of Delaware
Filed Mar. 2, 1966, Ser. No. 531,184
Int. Cl. G02f 1/34
U.S. Cl. 350—161                                    8 Claims The invention relates to means for providing a controllable mode of light beam deflection and has particular utility in the controlled deflection of laser light beams. The invention may be used in conjunction with visual displays where it is desired to rapidly traverse a display surface in raster fashion.

Certain crystalline structures exhibit an electromechanical characteristic which makes possible an adaptation to various uses. This characteristic, known as piezoelectricity or piezoelectric effect, is a naturel function by which mechanical stresses applied to the crystalline structure produce electrical charges. The phenomena is reversible, in that electrical charges applied to the crystalline structure produce therein mechanical stresses. This piezoelectric effect is exhibited by various substances such as quartz, tourmaline and Rochelle salt. In most applications, quartz crystals are used because of their demonstrated mechanical strength.

Typically, a quartz crystal is hexagonal in cross section. To obtain a useful piezoelectric effect sections are cut from the crystal, depending upon the effect desired to be produced. The hexagonal crystal may be considered as having three axes, the longitudinal or Z axis and perpendicular thereto, and to each other, an X and a Y axis. The Z axis is known as the optical axis and mechanical stresses along this axis produce no piezoelectric effect. For the purposes hereunder consideration, therefore, it is desirable to provide a crystal section which parallels the Z axis, namely, commonly known as an X or a Y cut. An X-cut crystal is one which is taken from the hexagonal quartz perpendicular to the X axis. Similarly, a Y-cut crystal parallels the Z axis and is perpendicular to the Y axis. Crystals of the X and Y cut prove satisfactory in view of the fact that they have a fluctuating frequency range up to 10 megacycles and additionally provide the optical transmission hereinafter described.

It is to be noted that if a voltage is applied to a crystal it will vibrate at a frequency of the applied voltage. Where a wide range of vibration frequencies are desired, an unreasonably long crystal is required. This disadvantage may be overcome by utilizing a duplex crystal which consists of two crystal plates congruently arranged and bonded together. With such a duplex crystal a voltage may be applied thereto which will make one plate expand and the other contract. The composite effect is to increase the total deformation of the entire unit.

In the present invention, it is proposed that a duplex crystal of the type described be mounted with one end thereof physically clamped against movement. The opposed surfaces of the duplex crystal and the interface are electrically conducting. By applying a field of one polarity to opposed surfaces and an opposite polarity to the interface, a deformation of the duplex crystal is induced proportional to the field. By controlling, in point of time, the intensity and frequency of the applied electrical field, a controlled vibration of the free end of the duplex crystal may be achieved. If a source of light or light beam is arranged to impinge on the fixed edge surface of the crystal, it will be apparent that the beam emitted from the opposed crystal edge surface may be controllably scanned in the direction of crystal flexure over a display surface. Furthermore, if the structure just described is cascaded, namely, provision is made for two duplex crystals appropriately end clamped in optical series with their planes of flexure arranged perpendicular to each other, a controlled two-dimensional display of the deflected beam will be provided. Thus, the beam may be moved over a display surface in raster fashion. The angular deflection gain of the beam is, of course, directly related to the maximum degree of flexure inherent in the particular duplex crystal structure employed. To obtain an even greater beam deflection the duplex crystal structure may be formed as a truncated prism. The inherent beam deflection of the prism is then added to the beam deflection due to the electrically induced flexure of the crystal.

These and other features of the invention will be more clearly understood by reference to the following specification and to the associated drawings, wherein:

FIGS. 4a and 4b are side elevational views of a typical crystal illustrating deflection gain under crystal deformation.

It will be recognized that duplex crystal plates capable of light transmission axially thereof may be made from various types of quartz crystal cuts. Satisfactory results have been obtained with cross-cut plates having relatively small width-to-length ratios. In the formation of the duplex plates hereunder consideration, the crystal plates are first cut and ground to the desired fixed dimension and surface smoothness. The surfaces thereof that are to be bonded may first be sprayed with a colloidal suspension of dispersed silver particles in a fluid and then baked to a high temperature to fix the electrically conducting silver particles in place thereon. The silver then may be burnished and tinned and the two tinned surfaces placed together under high pressure to squeeze or force out all of the excess solder. The resulting film will bond the plates together and provide an extremely thin though electrically conducting interface. The thin layer of silver between the plates has a negligible effect on its vibratory performance since it is located in the central plane. At this plane, tension and compression forces are essentially zero and there is virtually zero elongation. Additionally, the outer surfaces of the crystal are coated with evaporated silver to provide thereon an electrically conducting surface.

Figure 1:
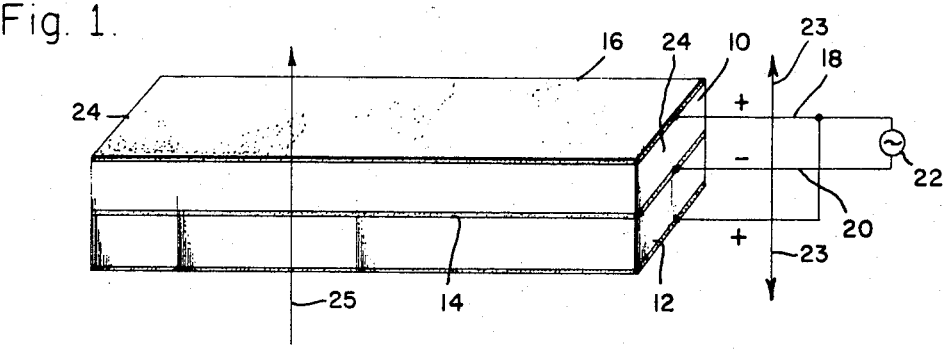
FIGURE 1 is a perspective view of a duplex crystal of the type employed in the invention.

FIG. 1 illustrates a duplex crystal and comprises an upper crystal 10 and lower crystal 12 having an electrically conductive silver interface 14 therebetween. The upper and lower surfaces 16, 16 of the duplex crystal have coated electrically conductive silver surfaces. Electrical leads such as positive leads 18, 18 are connected to the surfaces 16 and negative lead 20 of opposite polarity is connected to the interface 14. A generator 22 or other suitable source of electrical potential is provided so that controlled electrical fields may be applied to the structure. The application of an alternating voltage to the crystal of FIG. 1 would induce a vibration thereon perpendicular to the surfaces 16 and proportional to the frequency of the voltage applied. The flexure would occur about nodes located equidistant from opposed ends 24, 24 of the crystal, the degree of flexure of the opposed ends would be equal in magnitude. The field vectors of applied voltages are indicated by arrow 23 and crystal polarization vector is indicated by arrow 25.

Figure 2:
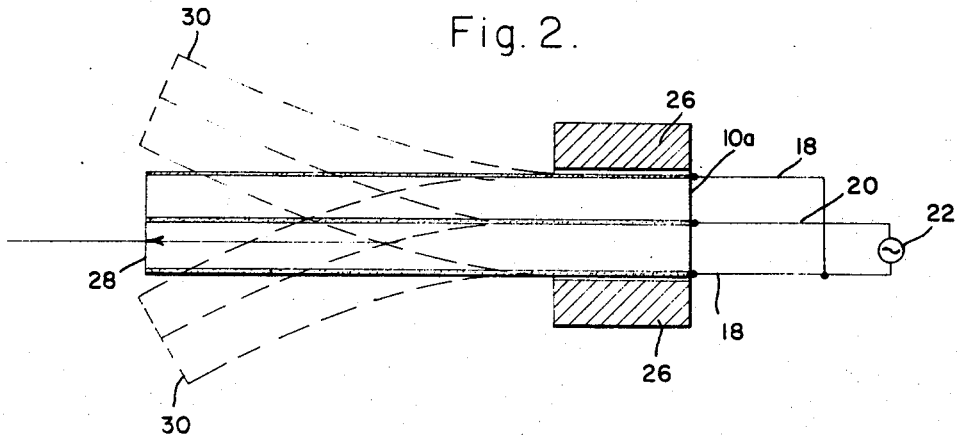
FIG. 2 is a side elevational view of a crystal similar to FIG. 1 and illustrating crystal flexure in response to voltage application.

Directing attention to FIG. 2, it will be seen at one end 10a is securely fixed in space by a clamp 26. Upon the application of a variable frequency voltage to the duplex crystal of FIG. 2 the free end 28 is induced to flex above and below the natural plane of the crystal as is shown in dotted lines at 30 and 32 and proportional to the frequency of the applied voltage. By controlling the potential level in both positive and negative directions the degree of flexure of the end 28 may be accurately controlled. By controlling the frequency of the applied field the time of flexure in a given direction may be controlled.

Figure 3:
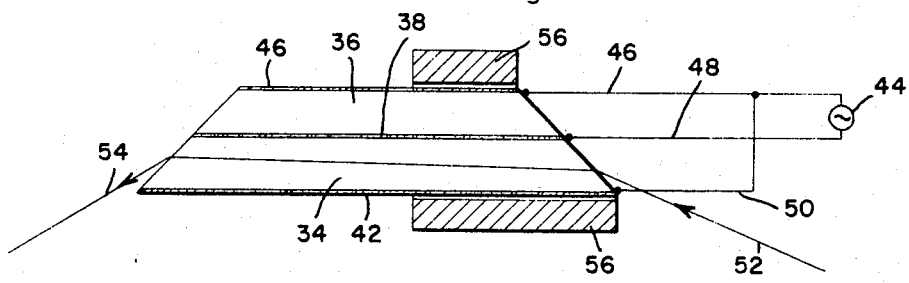
FIG. 3 is a side elevational view of a duplex crystal formed in the shape of a truncated prism.

Directing attention to FIG. 3, it will be noted that beam deflection may be increased by appropriate duplex crystal formation. Again the structure comprises upper and lower piezoelectric crystals 34 and 36 bonded together at interface 38, the latter being electrically conducting. The upper surface 40 and lower surface 42 are again electrically conducting and a controllable source of electrical potential such as a sawtooth generator 44 is connected to the respective surfaces via lines 46, 48 and 50.

As shown in the cross-sectional view of FIG. 3, the crystals 34 and 36 are in truncated prism form. With a fixed angle of the incoming monochromatic laser beam 52 relative too the crystal the flexure mode hereinafter described will produce incremental changes in prism geometrical orientation.

Again, one end of the crystal structure is rigidly clamped as at 56, 56 and in response to the application of predetermined electrical fields, the free or cantilevered end of the crystal will vibrate and deflect inducing a deflection of the transmitted light beam.

FIGURES 4a and 4b serve to demonstrate possible anticipated deflection gain in a typical arrangement. Structurally, the device here illustrated comprises upper and lower crystals 60 and 62 having a surface 64 in acute angular relation to the long crystal axis and surface 66 in perpendicular relation to said axis. As earlier described electrically conductive opposed surfaces 68 and 70 are provided and the crystals are joined by electrically conductive interface 72. Clamp 74 rigidly retains the crystals adjacent surface 66.

Considering FIG. 4a the numeral 76 shows a source of monochromatic laser beam light which is relatively fixed in space. The beam impinges on surface 64 at an angle $a$ relative to the surface normal $n$. Upon passing through the non-deflected crystals the beam leaves surface 66 at an angle $b$ relative to the incoming line as at 77. The beam is refracted and strikes on surface 80 a distance $d$ from an extension of the long axis 82 of the crystals.

FIG. 4b shows the structure of 4a upon the application of an electrical potential to the crystal and under induced flexure. As a result of flexure a new normal $n'$ to the surface 64 exists at the point of beam 76 entrance defining angle $a'$ which is less than angle $a$ by the increment $\Delta a$. In this flexure mode the beam exists from the surface 66 at an angle $b'$ relative to the incoming line of beam 76. Refraction causes the existing beam 77 (FIG. 4b) to strike the surface 80 at a point a distance $d'$ from an extension of the long axis 82 of the crystals. The incremental change in the refracted light is evidenced by the distance $d-d'$ and the angular incremental change by $b-b'$ and the angular incremental change by $b-b'$ or $\Delta b$.

Change relative to the incoming beam and as a result of flexure may be indicated by $\Delta b/\Delta a$ and is here defined as prism resolution or gain. Depending upon the magnitude of the applied electrical field the normal $n$ to the surface 64 will sweep through a determined angle. Likewise, the refracted beam emitted from surface 66 will sweep through a determined angle which will reflect a deflection gain is much larger than unity. Additionally, the deflection gain is much greater than any variation due to any incremental change in index of refraction of the prism due to crystal stress as a result of the piezoelectric effect.

It will be apparent to those skilled in the art that if two-dimensional deflection is desired it is only necessary to cascade two of the crystal structures described, that is, place them in operative light-transmitting series relationship. Of course, the planes of deflection of the cascaded arrangements must be in perpendicular relation. Thus, both horizontal and vertical beam deflection may be achieved.

It will thus be apparent with the structure disclosed a relatively simple and unique mode of inducing light beam deflection is provided. Additionally, the degree of deflection is readily controlled by the simple expedient of exercising control over the electrical field applied to the crystals so that display, in an intelligible fashion, of light-beam transmitted information becomes a relatively simple procedure.

Color superposition is also feasible by use of a multicolor source.

The invention as disclosed is by way of illustration and not limitation and may be modified all within the scope of the appended claims.

What is claimed is:
1. In a light beam deflection arrangement,
   a pair of light beam transmitting piezoelectric crystals arranged in surface abutting relationship,
   electrical conducting means on the abutting surfaces and on opposed surfaces of the crystals,
   a controllable source of electric potential,
   electrical lead means from the source to the respective surfaces,
   clamp means to support the crystals in cantilever fashion so that one end of the abutting crystals is free to move,
   said potential source being operative to apply an electric field to said surfaces and induce controlled flexure of said one end in direct proportion to the applied field and thereby controllably deflect a light beam being transmitted through the crystals.
2. A light beam deflection arrangement according to claim 1,
   wherein said clamp means supports the crystals at the end thereof opposite the mentioned end.
3. A light beam deflection arrangement according to claim 2,
   wherein said crystals are in the form of a truncated prism as seen in side elevational view.
4. In a light beam deflection arrangement,
   a pair of light beam transmitting piezoelectric crystals arranged in joined surface abutting relationship,
   electrical conducting means on the abutting surfaces and on opposed surfaces of the crystals,
   means to apply an electrical potential to the respective surfaces,
   clamp means supporting the crystals having at least one end thereof free to flex,
   said electrical potential means being operative to apply an electric field to the surfaces and induce controlled flexure of the crystals,
   a light receiving surface on one end of the crystals and a light transmitting surface on the other end of the crystals,
   and a beam of monochromatic light impinging on one of the last-mentioned surfaces and emitted from the other of said last-mentioned surfaces.
5. A light beam deflection arrangement according to claim 4,
   wherein one of the light surfaces is in acute angular relation to the long axis of the crystals.
6. A light beam deflection arrangement according to claim 5,
   wherein the other of said light surfaces is generally perpendicular to the long axis of the crystals.
7. A light beam deflection arrangement according to claim 6,
   wherein the light-receiving surface is in acute angular relation to the long axis and the light transmitting axis is perpendicular to said long axis.
8. A light beam deflection arrangement according to claim 7, wherein the beam of light impinges on the light-receiving surface in acute angular relation to a line normal to that surface.

References Cited

UNITED STATES PATENTS 1,980,888  11/1934  Thomas _____ 179—110

3,110,824  11/1963  Flanagan _____ 310——8.5

RONALD L. WIBERT, *Primary Examiner.*

P. K. GODWIN, *Assistant Examiner.*

U.S. Cl. X.R.

310—8.3, 8.5; 350—285

U.S. DEPARTMENT OF COMMERCE
PATENT OFFICE
Washington, D.C. 20231

UNITED STATES PATENT OFFICE
CERTIFICATE OF CORRECTION

Patent No. 3,442,570                                                                   May 6, 1969

Amos Picker

It is certified that error appears in the above identified patent and that said Letters Patent are hereby corrected as shown below:

Column 3, line 21, "too" should read -- to --; line 59, cancel "and the angular incremental change by b-b′"; line 67, cancel "is".

Signed and sealed this 14th day of April 1970.

(SEAL)
Attest:

Edward M. Fletcher, Jr.                                      WILLIAM E. SCHUYLER, JR.
Attesting Officer                                                   Commissioner of Patents